United States Patent [19]

Foster

[11] Patent Number: 4,678,492
[45] Date of Patent: Jul. 7, 1987

[54] BLOWING PROCESS FOR EXPANDING A MOLTEN GLASS PARISON

[75] Inventor: Thomas V. Foster, Doncaster, United Kingdom

[73] Assignee: Emhart Industries, Inc., Farmington, Conn.

[21] Appl. No.: 821,942

[22] Filed: Jan. 24, 1986

[30] Foreign Application Priority Data

Jan. 30, 1985 [GB] United Kingdom ................. 8502371

[51] Int. Cl.⁴ .............................................. C03B 9/36
[52] U.S. Cl. .......................................... 65/74; 65/76; 65/78; 65/81; 65/301
[58] Field of Search ....................... 65/301, 64, 74, 76, 65/81, 82, 78

[56] References Cited

U.S. PATENT DOCUMENTS 3,184,297  5/1965  Zonneveld .............................. 65/78
4,553,999 11/1985  Ziegler et al. .......................... 65/81

Primary Examiner—Arthur Kellogg
Attorney, Agent, or Firm—H. Samuel Kieser

[57] ABSTRACT

A molten glass parison is expanded to the shape of a mould cavity (16) to thereby form the parison into an article of glassware (A). Air is supplied under pressure to the interior of the parison so that an elevated pressure is created in the parison causing it to expand. The air under pressure passes through an on/off valve (30) before entering the parison and, during the blowing process, the air supply is interrupted at least twice by turning the valve off. Thus, the pressure is caused to fluctuate, during the blowing process.

3 Claims, 2 Drawing Figures

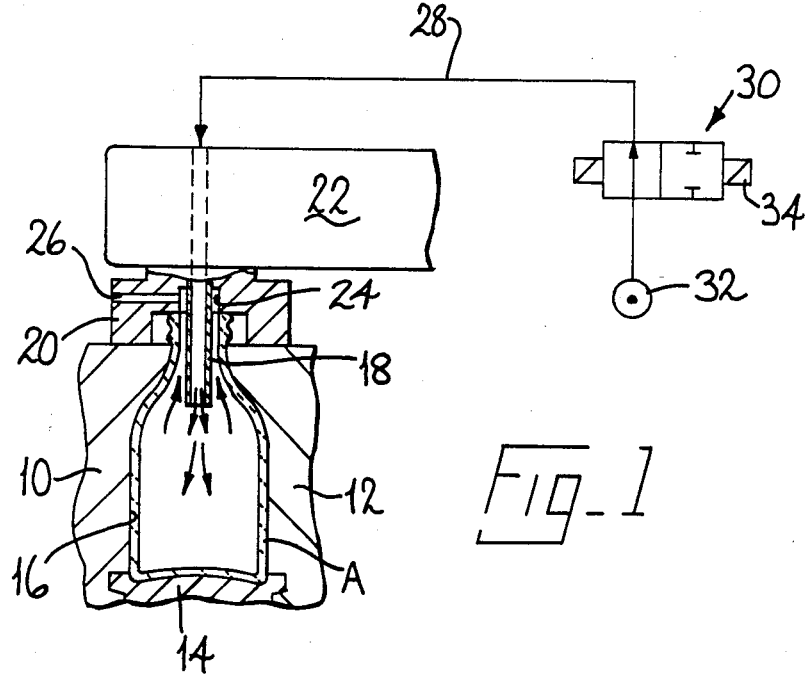
Fig_1
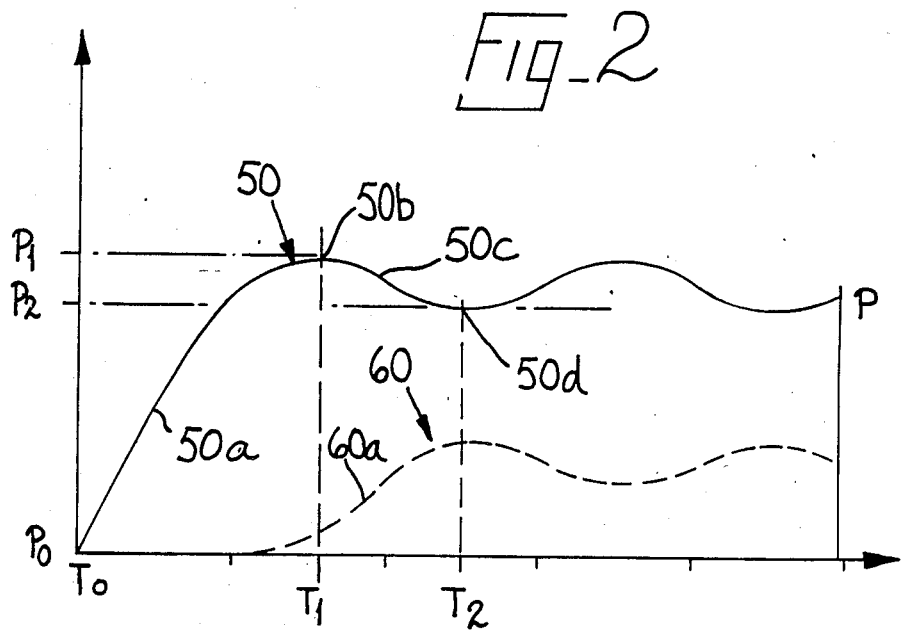
Fig_2

BLOWING PROCESS FOR EXPANDING A
MOLTEN GLASS PARISON

BACKGROUND OF THE INVENTION

This invention is concerned with a blowing process for expanding a molten glass parison to the shape of a mould cavity in which the parison is contained to thereby form the parison into an article of glassware, the method comprising supplying air under pressure to the interior of the parison so that an elevated pressure is created in the parison causing it to expand.

In the manufacture of hollow articles of glassware, a gob of molten glass containing sufficient glass to form one article is formed into a parison. The parison is an intermediate shape between the gob and the finished article and has a hollow interior. Parisons are either created by pressing or by a blowing operation. When the parison is created by pressing, the gob of molten glass is introduced into a "blank" mould in which the gob rests on top of a plunger. The plunger is then moved to press the glass to the shape of the mould and the plunger is withdrawn leaving a cavity in the glass which forms the hollow interior thereof. When the parison is formed by a blowing operation, the gob is introduced into the blank mould on top of a plunger which is then withdrawn leaving a hollow space in the gob into which air is blown to cause the glass to expand to the shape of the mould.

However the parison is formed, it is removed from the blank mould and transferred to a "finish" mould in which it is blown to the shape of the mould cavity by supplying air under pressure to the interior of the parison. The air is supplied by means of a blow head which, in most cases, comprises a tube which enters the neck of the parison and the air is supplied through this tube. It is necessary to extract heat from the interior of the parison during the blowing process so that the glass is set in the shape of the article. The heat is extracted by the air which is blown into the parison which leaves through the neck of the parison and through an exhaust passage in the blow head. Thus, during the blowing process there is a continual flow of air into the parison and out through the neck thereof. The time which is taken in the finish mould is a limiting factor on the speed of production of articles of glassware and this time is limited itself by the necessity to allow sufficient time for the heat extraction.

It is an object of the present invention to provide a blowing process for expanding a molten glass parison in which the heat can be extracted from the interior of the parison more rapidly thereby speeding up the process.

BRIEF SUMMARY OF THE INVENTION

The invention provides a blowing process for expanding a molten glass parison to the shape of a mould cavity in which the parison is contained to thereby form the parison into an article of glassware, the method comprising supplying air under pressure to the interior of the parison so that an elevated pressure is created in the parison causing it to expand, wherein the air under pressure passes through an on/off valve before entering the parison and, during the blowing process, the air supply is interrupted at least twice by turning the valve off.

In a blowing process according to the last preceding paragraph, the air pressure within the parison is caused to fluctuate, thereby creating turbulence and increasing the heat extraction from the glass. Preferably, the valve is switched off for a plurality of equal periods during the blowing process. The length of each period may be less than the periods during which the valve is turned on. The valve may be turned off at least ten times in each second during the blowing process, as this can readily be achieved using commercially available valves. However, the valve may be switched off up to 100 times per second to enhance the heat extraction further.

The invention also provides a blowing process for expanding a molten glass parison to the shape of a mould cavity in which the parison is contained to thereby form a parison into an article of glassware, the method comprising supplying air under pressure to the interior of the parison so that an elevated pressure is created in the parison causing it to expand, wherein the pressure of the air in the parison is caused to fluctuate, during the blowing process, by interrupting the air supply at least twice.

In a blowing process according to the last preceding paragraph, the pressure may be caused to fluctuate periodically between an upper and a lower value. The frequency of the fluctuation may be at least ten cycles per second. The fluctuations in pressure create turbulence within the parison thereby assisting in heat extraction and allowing a more rapid blowing process.

BRIEF DESCRIPTION OF THE DRAWINGS

There now follows a detailed description, to be read with reference to the accompanying drawings of a blowing process which is illustrative of the invention. It is to be understood that the illustrative process has been selected for description by way of example and not of limitation of the invention.

In the drawings:

FIG. 1 is a diagrammatic view showing an article being blown by the illustrative blowing process; and FIG. 2 is a graphical representation of the pressure against time in the parison and also of the air flow against time therein.

DETAILED DESCRIPTION OF PREFERRED EMBODIMENT OF THE INVENTION

The illustrative blowing process is for expanding a molten glass parison to the shape of a mould cavity in which the parison is contained to thereby form the parison into an article of glassware A. FIG. 1 shows the article A after it has been formed by expansion of a parison in a mould which comprises two side portions 10 and 12 and a bottom plate 14. The mould side portions 10 and 12 are movable towards and away from one another to cooperate in defining a mould cavity 16 when in engagement with one another and with the bottom plate 14 or to allow the removal of an article from the cavity 16 and its replacement by an un-blown parison. The illustrative method comprises supplying air under pressure through a tube 18 to the interior of the parison so that an elevated pressure is created in the parison causing it to expand to the shape of the mould cavity 16. The tube 18 projects through a neck portion of the parison and is supported by a blow head 20 which is in turn supported by an arm 22 which is movable vertically to bring the blow head 20 into engagement with the side portions 10 and 12 of the mould and to move the tube 18 into the neck of the parison. Air supplied through the tube 18, as shown by the arrows in FIG. 1, passes out of the tube 18 into the interior of the parison and then flows past the tube 18 through the neck of the parison into a passage 24 in the blow head 20 and then out to the atmosphere through an exhaust passage 26 in the blow head 20.

The air is supplied to the tube 18 through a pipe 28 which passes through a valve 30 on its way from a source of air under pressure 32 to the tube 18. The valve 30 is an on/off valve and comprises a solenoid 34 which when actuated causes the valve to switch on or off. In the illustrative method, the air under pressure, thus, passes from the source 32 through the valve 30 along the pipe 28 and through the tube 18 before entering the parison. During the blowing process, the air supply to the interior of the parison is interrupted at least twice by turning the valve 30 off by actuating the solenoid 34. In fact, the valve 30 is switched off for a plurality of equal periods during the blowing process, the length of each period being less than the periods during which the valve is turned on. The valve 30 is turned off at least ten times in each second, during the blowing process.

Turning the valve 30 off periodically during the blowing process, causes turbulence within the parison so that the heat extraction from the glass to the air is enhanced and the blowing process can be reduced in time when compared with conventional processes. FIG. 2 illustrates the pressure fluctuations during the blowing process. It will be observed that the pressure of the air in the parison is caused to fluctuate, during the blowing process, by interrupting the air supply as aforementioned. The pressure is caused to fluctuate periodically between an upper pressure P1 and a lower pressure P2 and the frequency of the fluctuation is at least ten cycles per second.

The curve 50 in FIG. 2 illustrates the pressure against time curve of the air in the parison during the blowing process. The pressure initially rises from atmospheric pressure P0 at time T0 along a portion of the curve 50a until, it reaches its maximum P1 at a point 50b. The pressure reaches P1 at a time T1 when the valve 30 is switched off. The pressure then falls along a portion of the curve 50c until the pressure reaches a lower pressure P2 at a point 50d at a time T2. The valve 30 is then switched on again to cause the pressure to rise back to the value P1 and is then switched off again to cause the pressure to fall to the value P2. This fluctuation of the pressure between the values P1 and P2 is repeated throughout the blowing process. In the illustrative blowing process, the valve 30 is switched on and off at equal intervals of time throughout the blowing process beginning when the pressure has reached the value P1, a longer period being allowed between the beginning of the process and the first switching off of the valve 30 for the first time to allow the pressure to increase to the value P1. However, in many cases, it will not be necessary to allow this longer period as the pressure will reach P1 very rapidly after the air is first supplied to the tube 18.

The curve 60 in FIG. 2 illustrates the air flow through the parison during the blowing process. It will be observed that flow does not commence until the pressure has built up considerably in the parison and the flow then increases on a portion of the curve 60a until after the valve has been switched off reaching a maximum flow at approximately the time T2 when the valve 30 is switched back on. Thereafter, the size of the flow fluctuates sinusoidally but lagging the curve 50 by half a cycle. It should be noted that the curves showing FIG. 2 illustrate only the first part of the blowing process.

I claim:

1. A process for expanding a molten glass parison to the shape of a mold cavity in which the parison is contained, by directing air at a selected pressure into the parison to thereby form the parison into an article of glassware the supplied air being discharged from the parison comprising continuously supplying said pressurized air into the interior of the parison until the pressure therein increases to said selected pressure, and thereafter, repetitively terminating said supplying of pressurized air for a duration predetermined to decrease the pressure to a second pressure and at frequency selected so that the pressure within the parison following a termination will cycle between said selected pressure and said second pressure.

2. A process according to claim 1 wherein the frequency is at least ten times per second.

3. A process according to claim 1, wherein the period when the supplying of air is terminated is less than the period when the supplying of air is continued following each termination.

* * * * *